United States Patent [19]
Tanaka et al.

[11] Patent Number: 4,666,257
[45] Date of Patent: May 19, 1987

[54] COMPACT ZOOM LENS

[75] Inventors: Tsunefumi Tanaka; Keiji Ikemori, both of Kanagawa; Nozomu Kitagishi; Sadatoshi Takahashi, both of Tokyo; Kikuo Momiyama, Kanagawa, all of Japan

[73] Assignee: Canon Kabushiki Kaisha, Tokyo, Japan

[21] Appl. No.: 705,565

[22] Filed: Feb. 26, 1985

[30] Foreign Application Priority Data

Feb. 27, 1984 [JP] Japan .................................. 59-35611

[51] Int. Cl.$^4$ ..................... G02B 9/64; G02B 15/14
[52] U.S. Cl. ..................................... 350/427; 350/432
[58] Field of Search .................. 350/427, 423, 432

[56] References Cited

U.S. PATENT DOCUMENTS

| | | | |
|---|---|---|---|
| 4,465,342 | 8/1984 | Tanaka et al. | 350/432 |
| 4,506,958 | 3/1985 | Imai | 350/427 |
| 4,523,814 | 6/1985 | Okudaira | 350/427 |

FOREIGN PATENT DOCUMENTS 0165107 12/1981 Japan ................................ 350/423
0168209 10/1982 Japan ................................ 350/423

Primary Examiner—John K. Corbin
Assistant Examiner—Rebecca D. Gass
Attorney, Agent, or Firm—Toren, McGeady and Goldberg

[57] ABSTRACT

A compact zoom lens including, from front to rear, a first lens unit of positive power, a second lens unit of negative power, a third lens unit of positive power and, if desired, further a fourth lens unit, with the separations between the first and second units, between the second and third units and between the third and fourth units being made variable to vary the focal length of the entire system, wherein as the focal length is varied from the shortest to the longest value, the first and third units move axially forward, and the third unit is provided with a positive lens having an aspherical surface.

4 Claims, 14 Drawing Figures

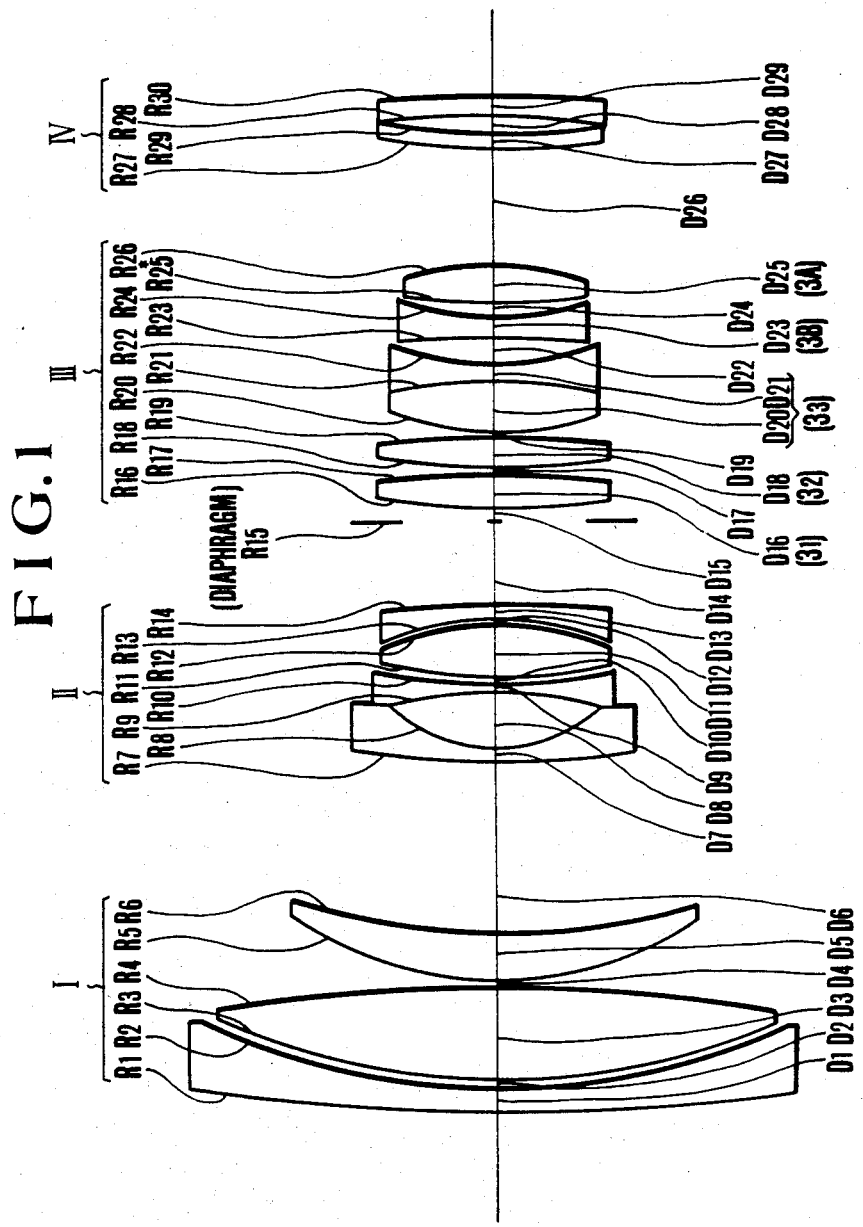

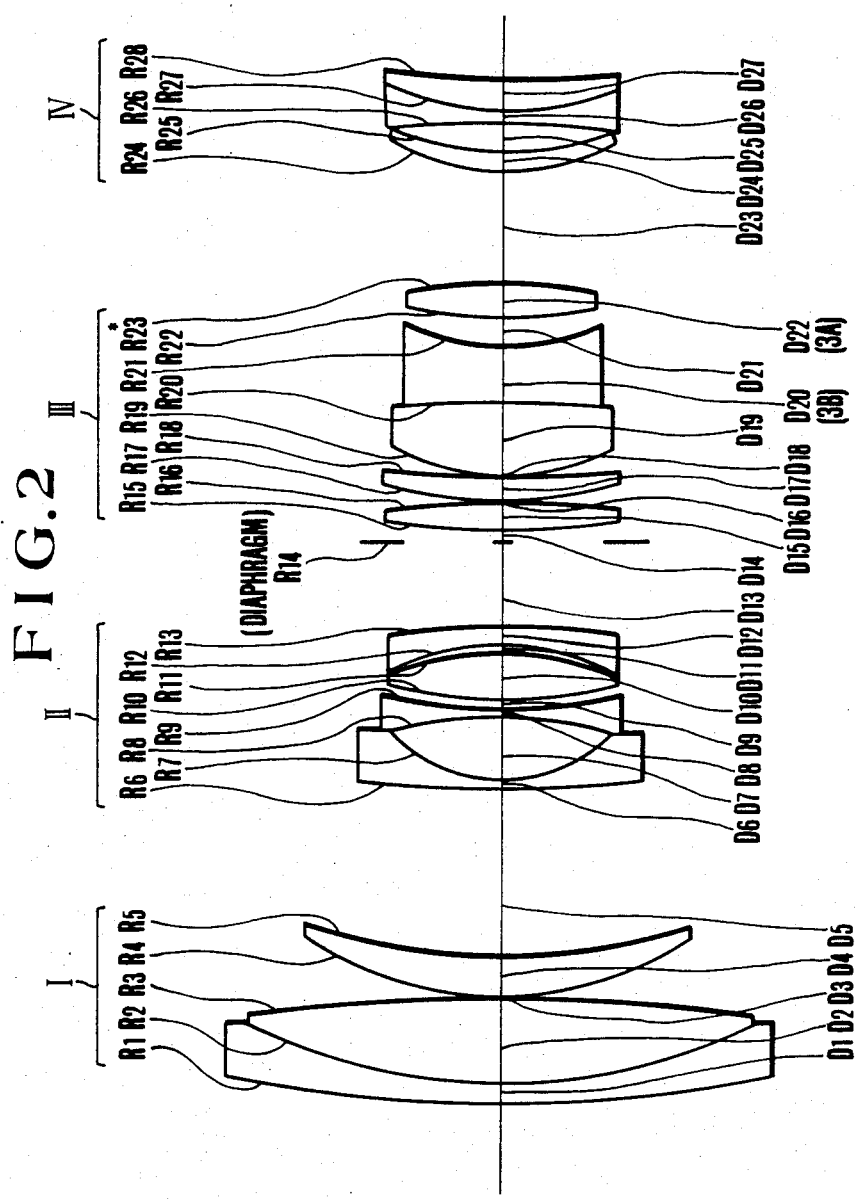

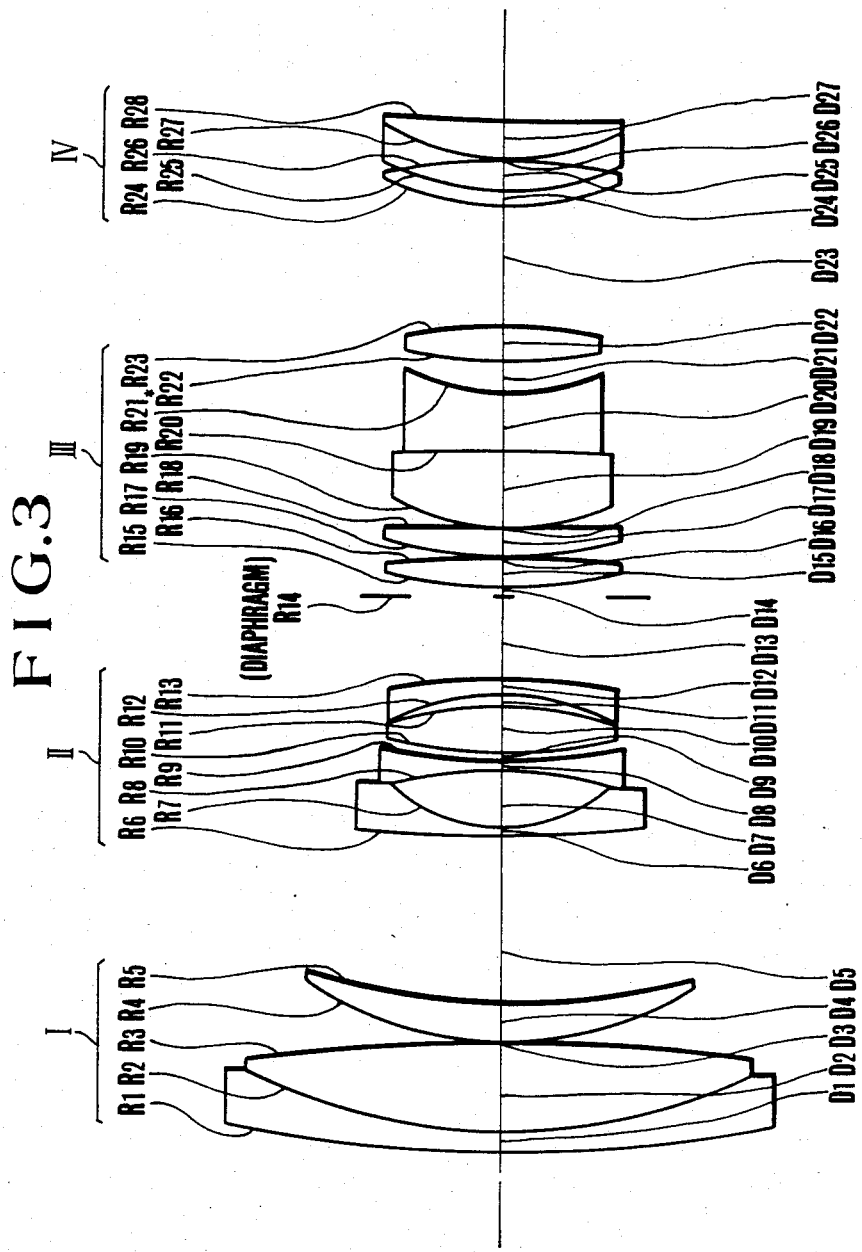

COMPACT ZOOM LENS

BACKGROUND OF THE INVENTION

1. Field of the Invention

This invention relates to compact zoom lenses, and more particularly to a zoom lens of reduced bulk and size with improved correction of aberrations throughout the zooming range by using an aspherical surface in one of relatively movable lens units.

2. Description of the Prior Art

Recently, small-sized light-weighted high performance compact zoom lenses have been demanded for photographic cameras, video cameras, and TV cameras.

To achieve a reduction of the total length and the outer diameter of the zoom lens and an improvement of the correction of aberrations throughout the entire zooming range, it is required that the refractive power of each of the lens units be strengthened and that an optimum power distribution has to be determined. Since strengthening of the refractive power generally teads to increase the various aberrations, it becomes very difficult to correct the aberration during zooming. Another method of reducing the bulk and size of the zoom lens is to increase the number of lens units movable for zooming with an advantage of facilitating an improvement of the correction of an aberrations throughout the zooming range. An example of an application of this method has been proposed in Japanese Laid-Open Patent Applications Nos. Sho 57-168209 and 57-169716 where the zoom lens comprises, from front to rear, a first lens unit of positive power, a second lens unit of negative power, a third lens unit of positive power and a fourth lens unit of positive power, all of which are made movable for zooming, with the use of a refractive power distribution that the on-axial rays of light emerging from the third lens unit are almost parallel. This refractive power distribution has, however, been found to be associated with a limitation on advance in the compactness of the zoom lens. Then, an alternative power distribution may be considered that the rays of light emerging from the third lens unit are convergent. The use of this power distribution, though providing the possibility of achieving a further reduction of the total length of the zoom lens, tends to increase the difficulty of removing the variation of aberrations with zooming for a high grade of imaging quality.

The zoom lenses of such type when constructed with the lens elements all of which have the spherical surface and corrected for various aberrations in each of the lens units, have generally an increased number of lens elements in each lens unit with the result that the total length and the weight tend to increase. When the bulk and size of the zoom lens is reduced by strengthening the refractive power of, for example, the third lens unit, the spherical aberration and astigmatism are increased within the third lens unit, becoming difficult to correct by a suitable design of the other lens units. Particularly, when an approach to the reduction of the range of variation of aberrations with zooming by correcting the aberrations of the lens units other than the third lens unit is employed, the power distribution becomes so improper that good correction of aberrations becomes difficult to be maintained throughout the zooming range.

An attempt has been made to enable the third lens unit to produce correction of the aberrations by using a diverging lens surface therein. But, this method has a disadvantage of unavoidably using an additional positive lens, sacrificing the reduction of the physical length of the lens system. Another disadvantage is the difficulty of well correcting the higher order aberrations produced from the strong diverging surface.

SUMMARY OF THE INVENTION

A first object of the invention is to shorten the length of the zoom lens or to reduce the lens diameter to realize a compact zoom lens.

A second object of the invention is to reduce the size of the zoom lens in such a manner that the image quality is prevented from deteriorating particularly without involving any great increase in the range of variation of aberrations with zooming as the aberrations are increased with a decrease in the size of the lens.

A third object is to achieve a high standard of correction of the various aberrations throughout the zooming range without having to increase the number of lens elements.

Other objects will become apparent from the description of embodiments of the invention.

BRIEF DESCRIPTION OF THE DRAWINGS

FIGS. 1, 2, 3 and 8 are longitudinal section views of numerical examples 1 to 4 of specific zoom lenses of the invention, respectively.

DETAILED DESCRIPTION OF THE PREFERRED EMBODIMENTS

Figure 4A:
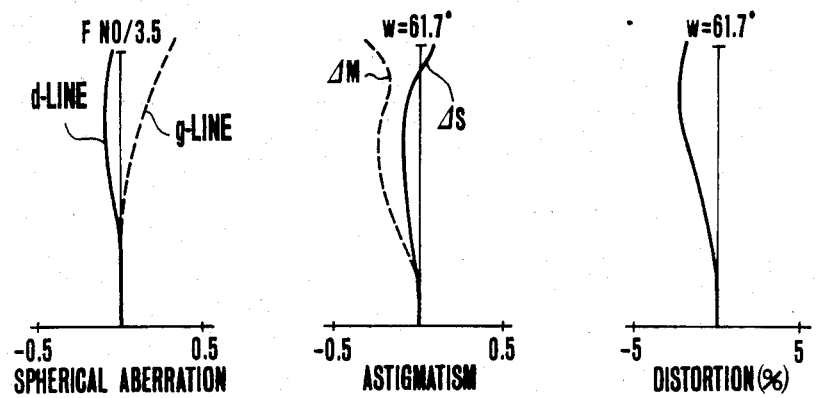
FIGS. 4A, 4B and 4C, FIGS. 5A, 5B and 5C and FIGS. 6A, 6B and 6C are graphic representations of the various aberrations of the lenses of FIGS. 1, 2 and 3 in the wide angle, intermediate and telephoto positions, respectively.
Figure 4B:
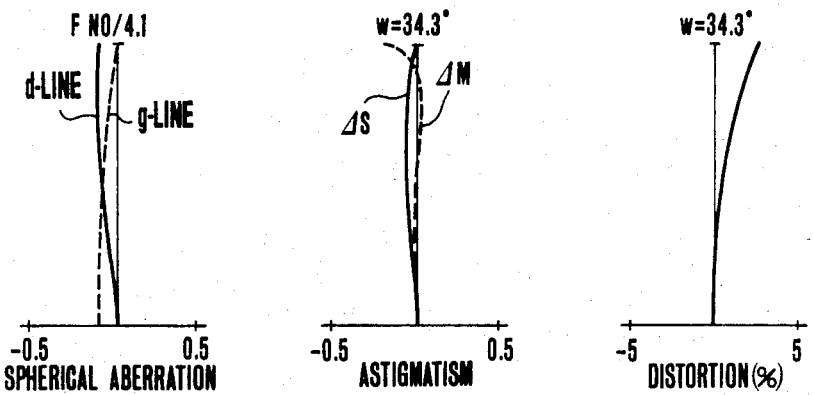
Figure 4C:
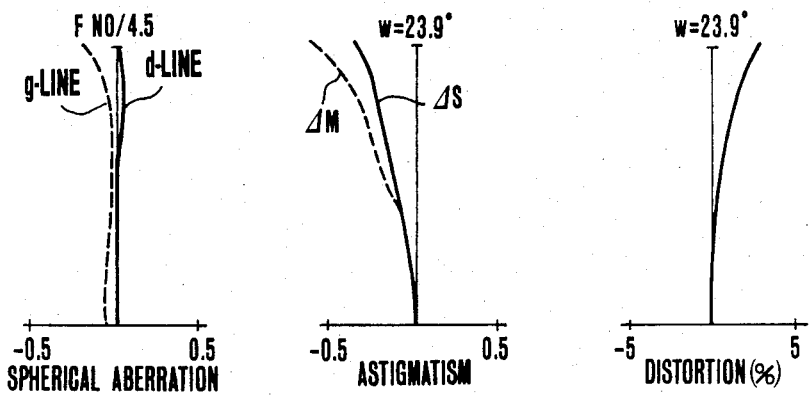
Figure 5A:
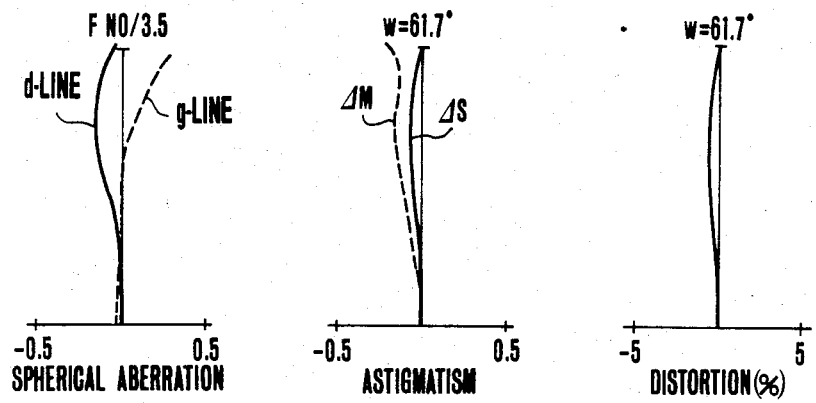
Figure 5B:
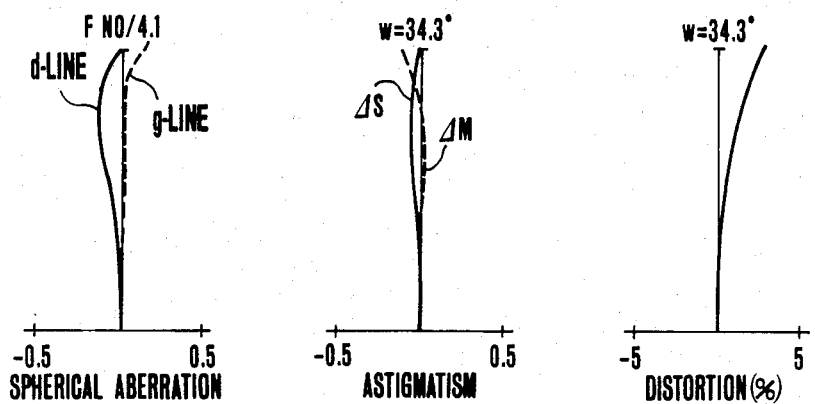
Figure 5C:
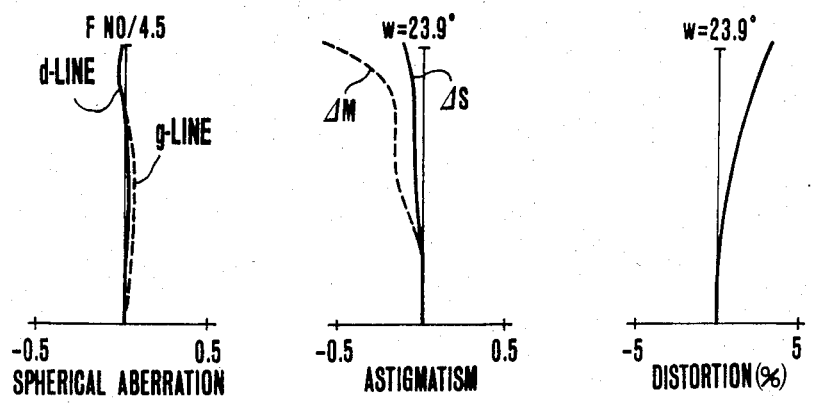
Figure 6A:
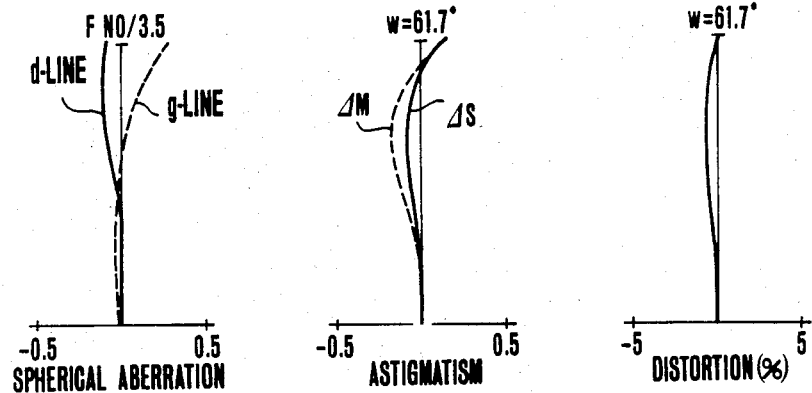
Figure 6B:
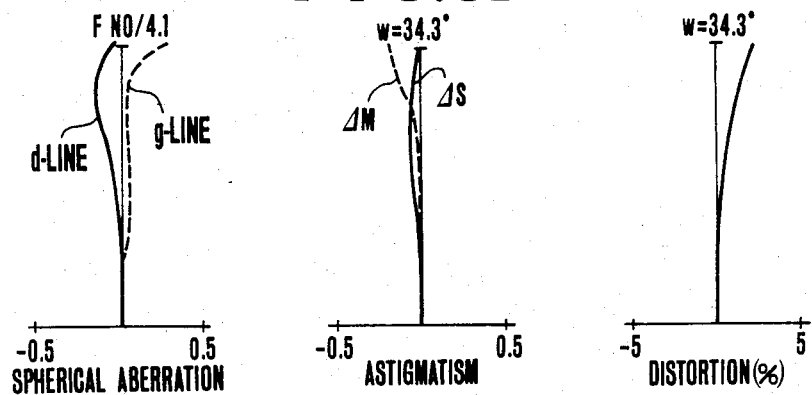
Figure 6C:
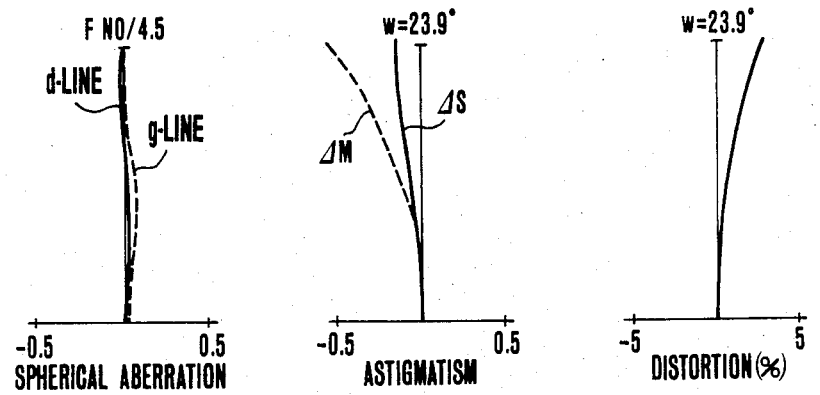

In FIGS. 1, 2, 3 and 8, there are shown specific embodiments of the invention. The zoom lenses depicted in these figures generally comprise, from front to rear, a first lens unit I of positive refractive power, a second lens unit II of negative refractive power, a third lens unit III of positive refractive power and a fourth lens unit IV, wherein zooming from the wide angle to the telephoto end is performed by moving the first and third lens units I and III axially forward and also by axially moving the second lens unit II; and the third lens unit III is provided with a lens 3A of positive refractive power of which at least one of the lens surfaces is made aspherical. The second lens unit may be otherwise made stationary during zooming, and the fourth lens unit IV may be moved with zooming to contribute to variation of the magnification power. Also, though the fourth lens unit has a duty of correcting aberrations and shortening the total length of the lens, it is also possible to omit the fourth lens unit so that the first three lens units constitute the entire system and all duty of aberration correction is borne on these lens units.

In the present invention, an aspherical surface is applied to a lens element of positive refractive power in the third lens unit to remove variation of aberrations with zooming and further to prevent the length of the lens system from increasing, thus achieving a compact zoom lens. The aspherical surface is preferably formed to such a shape that as the height from the optical axis increases, the positive refractive power weakens for the purpose of correcting spherical aberration and astigmatism at a time. In other words, the strengthening of the refractive power of the third lens unit results in under-correction of spherical aberration in the marginal zone and under correction of astigmatism in off-axial area. However, the refractive power becomes weaker in the marginal zone of the aspherical surface so that the spherical aberration and astigmatism can be both corrected to positive direction.

It is to be noted that as the third lens unit includes a lens of negative refractive power, this lens may be made aspherical. In this case, the spherical surface must be formed to such a shape that as the height increases, the negative refractive power strengthens. From the standpoint of easy aberration correction, it is preferred that the aspherical lens is of positive refractive power.

Within the above-described construction of the zoom lens, a diaphragm is necessarily positioned either in front of, or in a relatively forward space within, the third lens unit to achieve a compact zoom lens with a small diameter of the first lens unit. It should be pointed out here that the aforesaid aspherical surface is arranged as farther rearwardly of the diaphragm as possible to produce a higher effect on correction of astigmatism.

Next, in the present invention, to achieve a further reduction of the range of variation of the aberrations during zooming, the third lens unit is made to include at least one negative lens 3B and it is better to arrange the aforesaid lens 3A on the image side of this lens 3B.

The use of the lens 3B of negative refractive power in the third lens unit enables the diverging lens surface to correct the various aberrations ascribable to the positive refractive power of the third lens unit. Also, the arrangement of the aforesaid aspherical lens 3A in rear of the negative lens 3B enables the off-axial rays to pass through the marginal zone with an advantage of increasing the effect of correcting astigmatism.

Here, the effect of correcting aberrations by the aspherical surface of the invention is described in detail.

The aspherical surface can be figured by an equation for the axial deviation $\tilde{x}$ from the vertex at a height H from the optical axis where the reference spherical surface has a radius of curvature $\tilde{r}$:

$$\tilde{x} = \tilde{r} \left\{ 1 - \left( 1 - \frac{H^2}{\tilde{r}^2} \right)^{\frac{1}{2}} \right\} + \quad (1)$$

$$AH^2 + BH^4 + CH^6 + DH^8 + EH^{10}$$

(For more detail, see "Lens Design" by Matsui, published from Kyoritsu Shuppan Co. page 41).

A to E in equation (1) are called aspherical coefficients.

In the domain of third order aberrations, letting N denote the refractive index of the medium of object side, and N' the refractive index of the medium of image side, we have $$\frac{1}{\tilde{r}} = \frac{1}{r} + 2A \quad (2)$$

$$\Psi = (N' - N)\left\{ 8B - 2A\left( 4A^2 + 3 \cdot \frac{1}{r} \cdot \frac{1}{\tilde{r}} \right) \right\} \quad (3)$$

$$X_\nu = \left( \frac{N_\nu}{N'_\nu(N'_\nu - N_\nu)} \right)^2 \phi_\nu^3 - \quad (4)$$

$$\frac{N'_\nu + 3N_\nu}{N'^2_\nu(N'_\nu - N_\nu)} \phi_\nu^2 \left( \frac{a_\nu}{h_\nu} \right) +$$

$$\frac{2N'_\nu + 3N_\nu}{N'^2_\nu N_\nu} \phi_\nu \left( \frac{a_\nu}{h_\nu} \right)^2 - \frac{N'^2_\nu - N_\nu^2}{N'^2_\nu N_\nu^2} \left( \frac{a_\nu}{h_\nu} \right)^3$$

By equation (4), the $\nu$-th surface in the system is defined in terms of its refractive power $\phi_\nu$ with the values $a_\nu$ and $h_\nu$ for tracing a paraxial ray:

$$\begin{cases} a_{\nu+1} = a_\nu + h_\nu \phi_\nu \\ h_{\nu+1} = h_\nu - e_\nu' a_{\nu+1} \\ a_1 = 0 \\ h_1 = 1 \end{cases}$$

As has been stated above, the third lens unit has a negative lens element or elements. For all of their surfaces which are either exposed to air or in contact with a positive lens or lenses, the values of $X_\nu$ are summed up to obtain $$X_n = \Sigma X_\nu \text{(for the divergent surfaces)}$$

For all the surfaces in the third lens unit, the values of $X_\nu$ are summed up to obtain:

$$X_A = \Sigma X_\nu \text{(for all the surfaces)}$$

Using these values $X_N$ and $X_{A'}$ ranges for the aspherical quantity $\Psi$ can be given as follows:

$$|\Psi| < |X_N| \quad (5)$$

$$|X_A - X_N - \Psi| < \left| \frac{X_A}{3} \right| \quad (6)$$

When these conditions (5) and (6) are satisfied, improved results in aberration correction are attained. Condition (5) implies that the aspherical surfaces share less than ½ times the duty of correcting spherical aberration of the third lens unit. Condition (6) implies that the residual aberrations of the spherical system is further decreased to less than ⅓ times the value by the aspherical surface.

The third lens unit has a positive refractive power. An increase in this refractive power produces an advantage of shortening the total length of the lens system. To increase the value of the positive refractive power and the above-defined value $X_A'$ however, the value $X_N$ must be increased, giving rise to a difficult problem of correcting spherical aberration, coma and astigmatism simultaneously.

Figure 7:
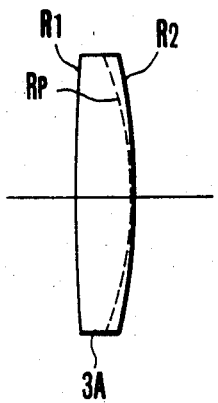
FIG. 7 is a sectional view of an aspherical lens of the invention.
Figure 8:
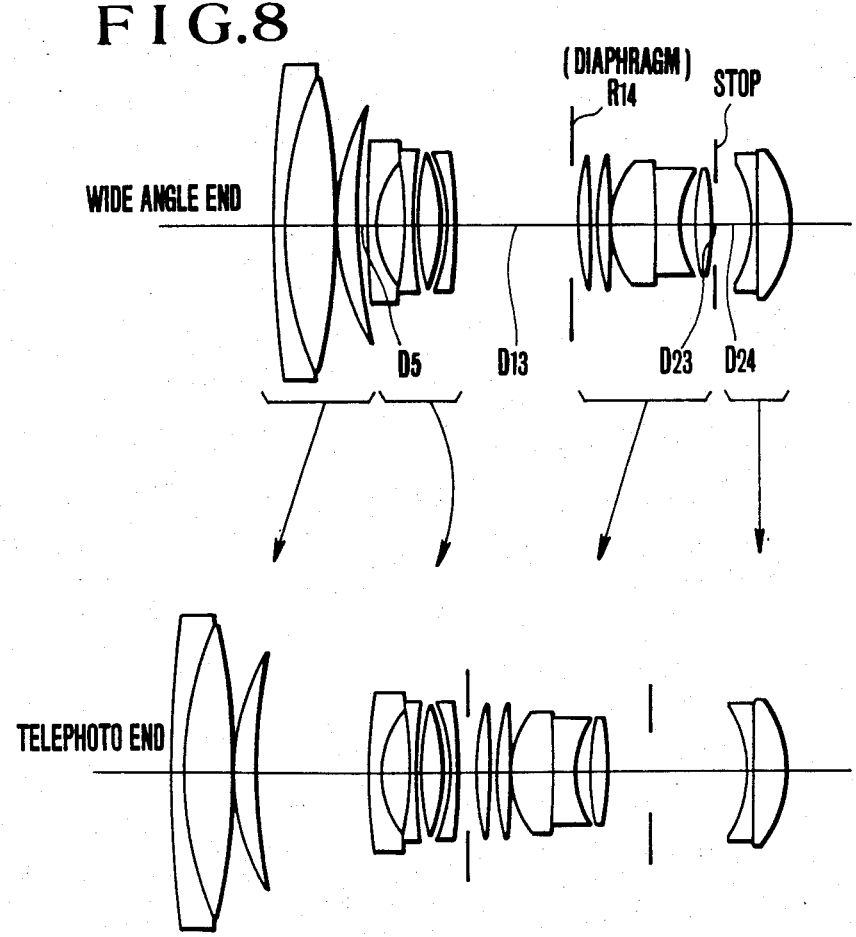

In the zoom lens of the invention, therefore, use is made of the aspherical surface on which is laid an equivalent function to that of an otherwise necessary diverging lens as shown by inequalities (5) and (6). With this, it becomes unnecessary to strengthen the divergency of the lens 3B of negative refractive power in the third lens unit when correction of spherical aberration is performed. By this, the problem of minimizing the coma and astigmatism at a time has been solved. FIG. 7 illustrates an example of the application of such an aspherical surface to the rear surface of the lens 3A of positive refractive power, where a solid curve R2 represents the aspherical surface, and a dashed curve Rp represents a reference spherical surface with its vertex in coincidence with that of the aspherical surface R2. This aspherical surface has such a form that the positive refractive power weakens in the marginal zone, in other words, the aspherical quantity Ψ takes a value of opposite sign to that of the value $X_4$. When the share of the aspherical surface for aberration correction exceeds the limit of inequality (5), or its degree of divergency is larger than that of divergency of the lens 3B, coma becomes difficult to correct, and at the same time overcorrection of astigmatism results.

Another inequality (6) represents the aberration share for sufficient effect of the aspherical surface. When below the limit, the effect diminishes.

The introduction of such an aspherical surface enables the residual aberrations of the entire system to be maintained stable throughout the zooming range. To achieve a further advance in the compactness by strengthening the convergency of the third lens unit, however, coma is produced over the entire zooming range. The most effective method for good correction of this coma is to use at least one strong refracting surface of forward convexity in the aforesaid fourth lens unit. The radius of curvature R of such surface lies preferably in the following range:

$$0.55 < \frac{R}{f_w} < 1.4$$

where $f_w$ is the shortest focal length of the entire system.

When the lower limit of inequalities of condition is exceeded, as the radius of curvature of the lens surface becomes too strong, higher order aberrations are increased objectionably. When the upper limit is exceeded, as the refractive power becomes too weak, insufficient correction of coma results.

Further assistance in the correction of the aberrations can be obtained, if the third lens unit is constructed as including, from front to rear, two lenses $3_1$ and $3_2$ of positive refractive power, and a cemented doublet $3_3$ of positive and negative lenses cemented together at their adjoining surfaces, while the aforesaid lens 3A is arranged in rear of these lenses $3_1$, $3_2$ and $3_3$. By such construction and arrangement of the lens elements, all rays can be refracted properly, and thereby the various aberrations are lessened.

In specific embodiments of the invention to be described later, one aspherical surface is used. But two or more aspherical surfaces may be used. In latter connection, it is needless to say that the effect is heightened.

Though it is recommended to manufacture aspherical lenses by numerical control glass grind techniques, the aspherical lenses may be made of plastic material by low unit-production techniques of setting plastic material in the aspherical mold. Also if somewhat large tolerances can be set for the decrease in the image quality and the accuracy of focusing control by the change of ambient temperature and humidity as in the zoom lenses for home video cameras, the use of an aspherical plastic lens will be advantageous. In the case of photographic lenses that require high precision accuracy, it is preferred to use a process comprising the steps of pouring molten optical glass into an aspherical surface mold and, after it is solidified, forming the surface. Also it is possible to use a method of forming a different shape in the outer peripheral portion of the lens. This method is preferred on the accuracy of assembling with the lens barrel.

For note, in the zoom lens of the invention, focusing may be carried out by moving the first lens unit, or, if it has the fourth lens unit, by moving the fourth lens unit.

As has been described above, according to the present invention, it is possible to achieve a high performance compact zoom lens.

Next, numerical specific examples of the invention are shown. In the numerical specific examples, Ri is the radius of curvature of the i-th lens surface counting from the front, Di is the i-th lens thickness or air separation counting from the front, and Ni and $\nu i$ are, respectively, the refractive index and the Abbe number of the glass of the i-th lens element counting from the front.

| Numerical Example 1: (the 25th surface is aspherical) | | | |
|---|---|---|---|
| F = 36.2 | FNO = 1:3.5-4.5 | 2ω = 61.7°-23.9° | |
| R1 = 167.10 | D1 = 2.30 | N1 = 1.80518 | $\nu 1$ = 25.4 |
| R2 = 57.52 | D2 = 0.10 | | |
| R3 = 55.84 | D3 = 9.07 | N2 = 1.60738 | $\nu 2$ = 56.8 |
| R4 = −155.42 | D4 = 0.12 | | |
| R5 = 31.73 | D5 = 4.23 | N3 = 1.60729 | $\nu 3$ = 59.4 |
| R6 = 55.96 | D6 = Variable | | |
| R7 = 121.76 | D7 = 1.20 | N4 = 1.83400 | $\nu 4$ = 37.2 |
| R8 = 15.12 | D8 = 5.16 | | |
| R9 = −40.43 | D9 = 1.20 | N5 = 1.80610 | $\nu 5$ = 40.9 |
| R10 = 86.52 | D10 = 0.02 | | |
| R11 = 29.90 | D11 = 5.09 | N6 = 1.84666 | $\nu 6$ = 23.9 |
| R12 = −30.48 | D12 = 0.48 | | |
| R13 = −22.04 | D13 = 1.20 | N7 = 1.83400 | $\nu 7$ = 37.2 |
| R14 = −126.12 | D14 = Variable | | |
| R15 = Diaphragm | D15 = 1.00 | | |
| R16 = 64.02 | D16 = 3.20 | N8 = 1.71700 | $\nu 8$ = 47.9 |
| R17 = −87.43 | D17 = 0.10 | | |
| R18 = 37.76 | D18 = 3.36 | N9 = 1.66672 | $\nu 9$ = 48.3 |
| R19 = −270.01 | D19 = 0.10 | | |
| R20 = 23.44 | D20 = 4.98 | N10 = 1.51823 | $\nu 10$ = 59.0 |
| R21 = −57.27 | D21 = 1.74 | N11 = 1.84666 | $\nu 11$ = 23.9 |
| R22 = 29.95 | D22 = 1.80 | | |
| R23 = 989.60 | D23 = 2.03 | N12 = 1.80610 | $\nu 12$ = 40.9 |
| R24 = 26.82 | D24 = 1.07 | | |
| R25 = 58.54 | D25 = 3.37 | N13 = 1.59551 | $\nu 13$ = 39.2 |
| R26 = −25.04 | D26 = Variable | | |
| R27 = 43.51 | D27 = 1.75 | N14 = 1.56732 | $\nu 14$ = 42.8 |
| R28 = 64.76 | D28 = 1.46 | | |
| R29 = −57.76 | D29 = 1.32 | N15 = 1.83400 | $\nu 15$ = 37.2 |
| R30 = −442.54 | | | |

| Aspherical Coefficients |
|---|
| A = 0 |
| B = 8.784 × 10$^{-6}$ |
| C = 3.167 × 10$^{-9}$ |
| D = 1.018 × 10$^{-10}$ |
| E = −3.235 × 10$^{-13}$ |

| f | 36.2 | 70.1 | 101.9 |
|---|---|---|---|
| $D_6$ | 2.20 | 14.22 | 20.37 |
| $D_{14}$ | 19.72 | 7.70 | 1.55 |
| $D_{26}$ | 1.00 | 9.94 | 14.86 |

| Numerical Example 2: (The 23rd surface is aspherical) | | | |
|---|---|---|---|
| F = 36.2 | FNO = 1:3.5-4.5 | 2ω = 61.7°-23.9° | |
| R1 = 147.21 | D1 = 2.30 | N1 = 1.80518 | $\nu 1$ = 25.4 |
| R2 = 56.68 | D2 = 7.43 | N2 = 1.65160 | $\nu 2$ = 58.6 |
| R3 = −173.13 | D3 = 0.12 | | |
| R4 = 31.76 | D4 = 3.50 | N3 = 1.58913 | $\nu 3$ = 61.0 |
| R5 = 54.26 | D5 = Variable | | |
| R6 = 96.59 | D6 = 1.20 | N4 = 1.80610 | $\nu 4$ = 40.9 |
| R7 = 15.31 | D7 = 5.27 | | |
| R8 = −38.12 | D8 = 1.20 | N5 = 1.88300 | $\nu 5$ = 40.8 |
| R9 = 95.63 | D9 = 0.14 | | |

-continued

| | | | |
|---|---|---|---|
| R10 = 32.00 | D10 = 4.51 | N6 = 1.80518 | ν6 = 25.4 |
| R11 = −32.05 | D11 = 0.85 | | |
| R12 = −21.85 | D12 = 1.20 | N7 = 1.77250 | ν7 = 49.6 |
| R13 = −83.13 | D13 = Variable | | |
| R14 = Diaphragm | D14 = 1.00 | | |
| R15 = 55.73 | D15 = 2.39 | N8 = 1.65160 | ν8 = 58.6 |
| R16 = −214.99 | D16 = 0.10 | | |
| R17 = 34.10 | D17 = 2.54 | N9 = 1.69680 | ν9 = 55.5 |
| R18 = 131.87 | D18 = 0.10 | | |
| R19 = 22.79 | D19 = 6.74 | N10 = 1.51742 | ν10 = 52.4 |
| R20 = −159.42 | D20 = 4.80 | N11 = 1.84666 | ν11 = 23.9 |
| R21 = 17.73 | D21 = 2.59 | | |
| R22 = 42.00 | D22 = 3.12 | N12 = 1.59551 | ν12 = 39.2 |
| R23 = −39.82 | D23 = Variable | | |
| R24 = 23.65 | D24 = 1.51 | N13 = 1.59551 | ν13 = 39.2 |
| R25 = 27.21 | D25 = 2.13 | | |
| R26 = −473.23 | D26 = 1.32 | N14 = 1.80400 | ν14 = 46.6 |
| R27 = 31.10 | D27 = 2.70 | N15 = 1.61293 | ν15 = 37.0 |
| R28 = 105.43 | | | |

Aspherical Coefficient
A = −7.313 × 10⁻⁴
B = 1.264 × 10⁻⁵
C = −2.647 × 10⁻⁸
D = 1.449 × 10⁻¹⁰
E = 2.233 × 10⁻¹²

| f | 36.2 | 70.1 | 101.9 |
|---|---|---|---|
| $D_5$ | 1.55 | 13.57 | 19.70 |
| $D_{13}$ | 19.90 | 7.88 | 1.75 |
| $D_{23}$ | 1.03 | 9.97 | 14.89 |

Numerical Example 3: (The 22nd surface is aspherical)
F = 36.2   FNO = 1:3.5−4.5   2ω = 61.7°−23.9°

| | | | |
|---|---|---|---|
| R1 = 154.01 | D1 = 2.30 | N1 = 1.80518 | ν1 = 25.4 |
| R2 = 58.98 | D2 = 7.51 | N2 = 1.65160 | ν2 = 58.6 |
| R3 = −168.16 | D3 = 0.12 | | |
| R4 = 31.86 | D4 = 3.52 | N3 = 1.58913 | ν3 = 61.0 |
| R5 = 54.68 | D5 = Variable | | |
| R6 = 98.12 | D6 = 1.20 | N4 = 1.80610 | ν4 = 40.9 |
| R7 = 15.33 | D7 = 5.23 | | |
| R8 = −38.16 | D8 = 1.20 | N5 = 1.88300 | ν5 = 40.8 |
| R9 = 105.06 | D9 = 0.14 | | |
| R10 = 32.42 | D10 = 4.38 | N6 = 1.80518 | ν6 = 25.4 |
| R11 = −33.12 | D11 = 0.98 | | |
| R12 = −22.19 | D12 = 1.20 | N7 = 1.77250 | ν7 = 49.6 |
| R13 = −84.08 | D13 = Variable | | |
| R14 = Diaphragm | D14 = 1.00 | | |
| R15 = 55.83 | D15 = 2.30 | N8 = 1.65160 | ν8 = 58.6 |
| R16 = −208.99 | D16 = 0.10 | | |
| R17 = 35.59 | D17 = 2.69 | N9 = 1.69680 | ν9 = 55.5 |
| R18 = 140.96 | D18 = 0.10 | | |
| R19 = 21.90 | D19 = 6.84 | N10 = 1.51742 | ν10 = 52.4 |
| R20 = −156.53 | D20 = 4.80 | N11 = 1.84666 | ν11 = 23.9 |
| R21 = 17.50 | D21 = 2.96 | | |
| R22 = 45.30 | D22 = 3.06 | N12 = 1.59551 | ν12 = 39.2 |
| R23 = −36.58 | D23 = Variable | | |
| R24 = 23.00 | D24 = 1.44 | N13 = 1.59551 | ν13 = 39.2 |
| R25 = 25.66 | D25 = 2.07 | | |
| R26 = −215.07 | D26 = 1.32 | N14 = 1.80400 | ν14 = 46.6 |
| R27 = 31.74 | D27 = 2.70 | N15 = 1.61293 | ν15 = 37.0 |
| R28 = 189.56 | | | |

Aspherical Coefficient
A = 7.300 × 10⁻⁴
B = −1.264 × 10⁻⁵
C = 2.647 × 10⁻⁸
D = −1.450 × 10⁻¹⁰
E = −2.230 × 10⁻¹²

| f | 36.2 | 70.1 | 101.9 |
|---|---|---|---|
| $D_5$ | 1.55 | 13.57 | 19.70 |
| $D_{13}$ | 19.56 | 7.55 | 1.41 |
| $D_{23}$ | 1.56 | 10.50 | 15.42 |

Numerical Example 4: (R23 is the aspherical surface)
F = 36.27   FNO = 1:35−4.5   2ω = 61.9°−23.9°

| | | | |
|---|---|---|---|
| R1 = 185.85 | D1 = 2.25 | N1 = 1.80518 | ν1 = 25.4 |
| R2 = 61.38 | D2 = 7.86 | N2 = 1.60311 | ν2 = 60.7 |
| R3 = −130.58 | D3 = 0.12 | | |
| R4 = 35.12 | D4 = 4.00 | N3 = 1.60311 | ν3 = 60.7 |
| R5 = 72.96 | D5 = Variable | | |
| R6 = 375.57 | D6 = 1.20 | N4 = 1.80400 | ν4 = 46.6 |
| R7 = 16.81 | D7 = 5.21 | | |
| R8 = −39.91 | D8 = 1.15 | N5 = 1.83481 | ν5 = 42.7 |
| R9 = 88.57 | D9 = 0.23 | | |
| R10 = 34.00 | D10 = 4.50 | N6 = 1.80518 | ν6 = 25.4 |
| R11 = −34.00 | D11 = 0.79 | | |
| R12 = −23.81 | D12 = 1.15 | N7 = 1.80400 | ν7 = 46.6 |
| R13 = −82.07 | D13 = Variable | | |
| R14 = Diaphragm | D14 = 1.00 | | |
| R15 = 52.60 | D15 = 2.42 | N8 = 1.65160 | ν8 = 58.6 |
| R16 = −162.08 | D16 = 0.10 | | |
| R17 = 35.71 | D17 = 2.98 | N9 = 1.72000 | ν9 = 50.2 |
| R18 = 280.93 | D18 = 0.10 | | |
| R19 = 21.94 | D19 = 7.29 | N10 = 1.54072 | ν10 = 47.2 |
| R20 = −80.00 | D20 = 3.28 | N11 = 1.84666 | ν11 = 23.9 |
| R21 = 15.99 | D21 = 2.90 | | |
| R22 = 52.19 | D22 = 2.90 | N12 = 1.59551 | ν12 = 39.2 |
| R23 = −39.09 | D23 = Variable | | |
| R24 = −21.02 | D24 = Variable | | |
| R25 = 532.73 | D25 = 1.30 | N13 = 1.80400 | ν13 = 46.6 |
| R26 = −20.08 | D26 = 5.10 | N14 = 1.63930 | ν14 = 44.9 |

Aspherical Coefficient
A = 0
B = 5.4772 × 10⁻⁶
C = −4.30455 × 10⁻⁸
D = 3.4 × 10⁻¹⁰

| f | 36.27 | 102.0 |
|---|---|---|
| $D_5$ | 1.66 | 19.04 |
| $D_{13}$ | 18.81 | 1.42 |
| $D_{23}$ | 0.16 | 6.72 |
| $D_{24}$ | 5.8 | 15.30 |

For note, in the numerical example 4. when zooming, the first and third lens units are moved as a unit, and the diaphragm is moved as a unit with the third lens unit.

What is claimed is:

1. A zoom lens comprising:
   from front to rear, a first lens unit of positive refractive power, a second lens unit of negative refractive power and a third lens unit of positive refractive power, the separation between said first lens unit and said second lens unit, and the separation between said second lens unit and said third lens unit being made variable to vary the focal length of the entire system;
   wherein when the focal length is varied from the shortest to the longest, said first lens unit and said third lens unit move forward, and said third lens unit includes a positive lens having at least one aspherical surface, and wherein said third lens unit includes a plurality of positive lenses and at least one negative lens on the ojbect side of the positive lens having the aspherical surface, the axial deviation $\tilde{x}$ of the aspherical surface from its vertex at a height H from an optical axis is expressed by $$\tilde{x} = \tilde{r}\left\{1 - \left(1 - \frac{H^2}{\tilde{r}^2}\right)^{\frac{1}{2}}\right\} + AH^2 + BH^4 + CH^6 + DH^8 + EH^{10}$$

where $\tilde{r}$ is the radius of curvature of a reference spherical surface, and A, B, C, D and E are aspherical coefficients, in the domain of third-order aberrations, letting N denote the refractive index of the object space of any lens surface, and N' the refractive index of the image space, $\Psi$ for the aspherical surface and $X_\nu$ for the $\nu$-th lens surface are defined as follows:

$$\Psi = (N' - N)\left\{ 8B - 2A\left(4A^2 + 3 \cdot \frac{1}{r} \cdot \frac{1}{\bar{r}}\right)\right\}$$

$$\frac{1}{\bar{r}} = \frac{1}{r} + 2A$$

$$X_\nu = \left(\frac{N_\nu}{N_\nu'(N_\nu' - N_\nu)}\right)^2 \phi_\nu^3 -$$

$$\frac{N_\nu' + 3N_\nu}{N_\nu'^2(N_\nu' - N_\nu)} \phi_\nu^2 \left(\frac{a_\nu}{h_\nu}\right) +$$

$$\frac{2N_\nu' + 3N_\nu}{N_\nu'^2 N_\nu} \phi_\nu \left(\frac{a_\nu}{h_\nu}\right)^2 - \frac{N_\nu'^2 - N_\nu^2}{N_\nu'^2 N_\nu^2}\left(\frac{a_\nu}{h_\nu}\right)^3$$

where $\phi_\nu$ is the refractive power of the $\nu$-th lens surface, and $a_\nu$ and $h_\nu$ are the values for tracing a paraxial ray determined by:

$$\begin{cases} a_{\nu+1} = a_\nu + h_\nu \phi_\nu \\ h_{\nu+1} = h_\nu - e_\nu' a_{\nu+1} \\ a_1 = 0 \\ h_1 = 1 \end{cases}$$

and, letting $X_N$ denote the total sum of the values of $X_\nu$ for all the surfaces of a negative lens or lenses, and $X_A$ the total sum of the values of $X_\nu$ for all the lens surfaces in said third lens unit, the following conditions are satisfied:

$$|\Psi| < |X_N|$$

$$|X_A - X_N - \Psi| < |X_A/3|.$$

2. A zoom lens according to claim 1, wherein said third lens unit includes a plurality of positive lenses and a doublet lens of positive and negative elements on the object side of the positive lens having the aspherical surface.

3. A zoom lens according to claim 1, further comprising: a fourth lens unit on the image side of said third lens unit.

4. A zoom lens according to claim 3, wherein said fourth lens unit has a negative refractive power.

* * * * *